Jan. 9, 1934.    P. R. BASSETT    1,942,470
GYRO VERTICAL FOR AIRCRAFT
Filed Jan. 13, 1931    2 Sheets-Sheet 1
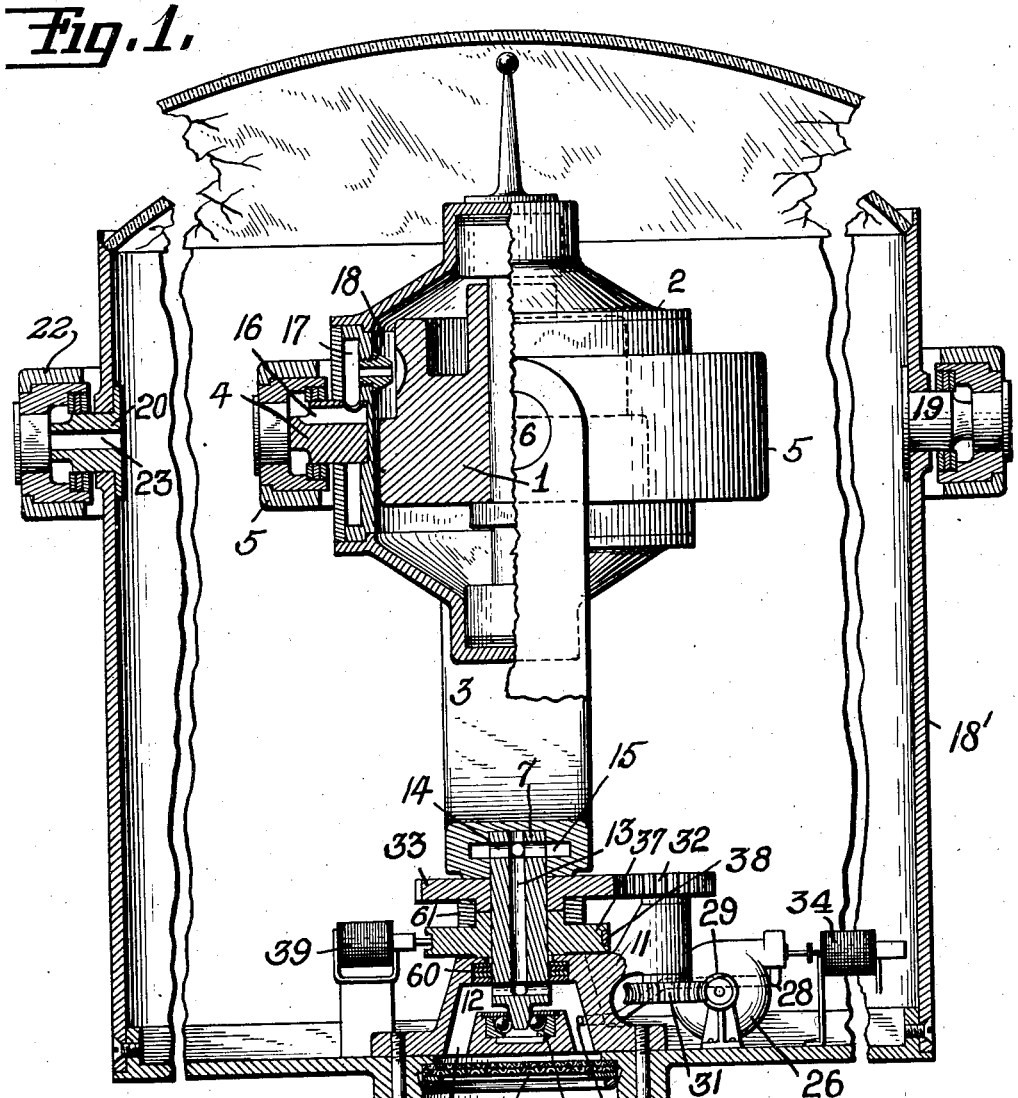
INVENTOR
PRESTON R. BASSETT.
BY
his ATTORNEY.

Jan. 9, 1934.  P. R. BASSETT  1,942,470
GYRO VERTICAL FOR AIRCRAFT
Filed Jan. 13, 1931   2 Sheets-Sheet 2
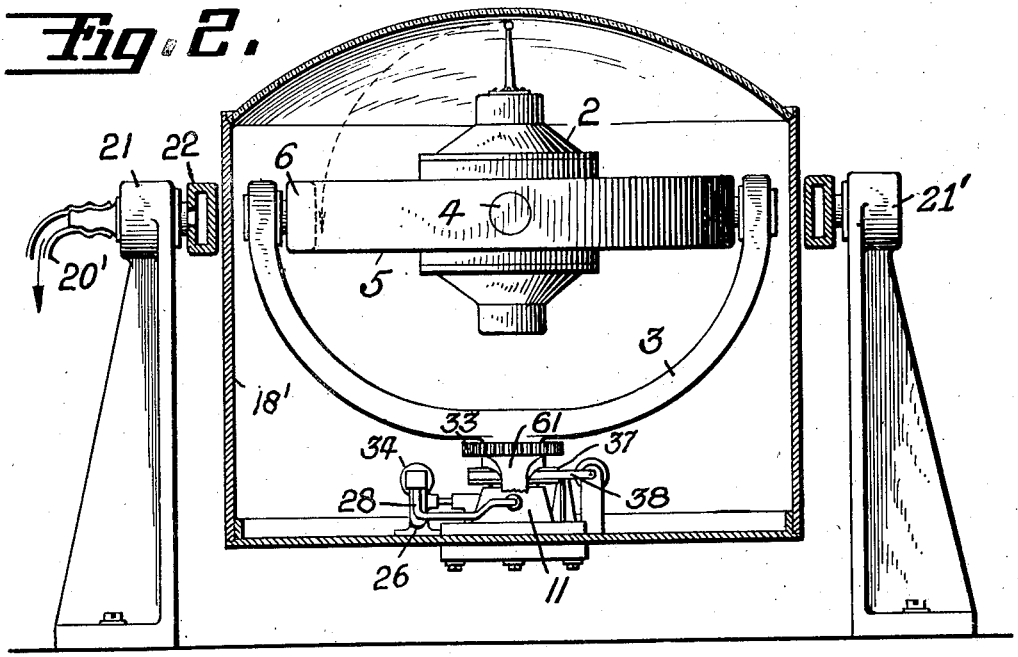
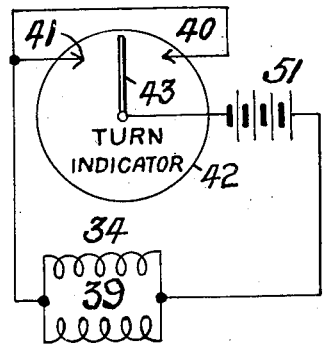
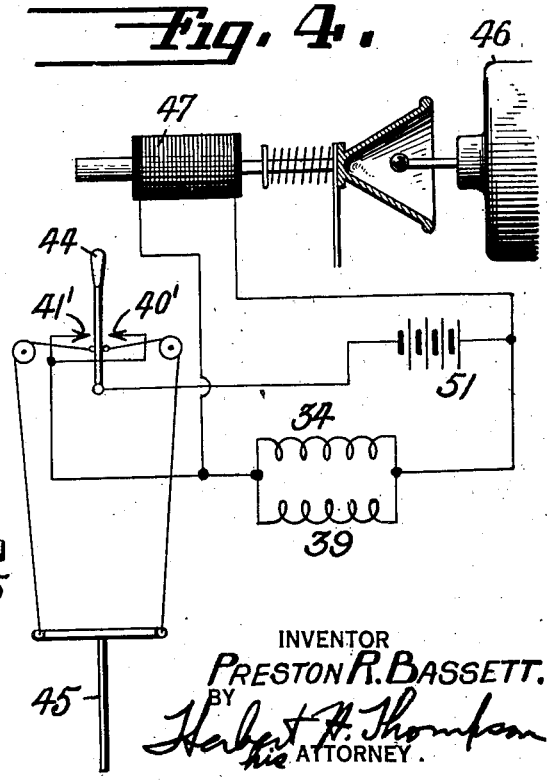
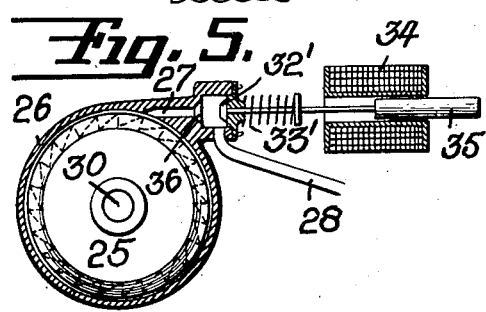
INVENTOR
PRESTON R. BASSETT.
BY
Herbert H. Thompson
his ATTORNEY.

Patented Jan. 9, 1934

1,942,470

UNITED STATES PATENT OFFICE 1,942,470

GYRO VERTICAL FOR AIRCRAFT

Preston R. Bassett, Rockville Center, N. Y., assignor to Sperry Gyroscope Company, Inc., Brooklyn, N. Y., a corporation of New York Application January 13, 1931. Serial No. 508,391

11 Claims. (Cl. 244—29)

This invention relates to gyro verticals, that is, to gyroscopes mounted for freedom about two horizontal axes of support and designed to maintain a horizontal or vertical reference plane. Such gyroscopes are usually provided with a gimbal support. It has been found experimentally that if the gimbals are rotated about the spinning axis of the gyroscope that an erecting torque is exerted on the gyroscope tending to line the spinning axis up by the shortest path with the axis about which the gimbals are rotated. This torque is probably due to the friction of the gimbal support. This method of erecting the gyroscope has certain advantages over that of making the gyroscope pendulous, since the torque is in the proper direction to precess the gyroscope directly into the vertical while the torque due to pendulosity is such as to set up an oscillation, because the precession of the gyroscope is at right angles to the action of gravity on the pendulous mass of the gyroscope. The erecting torque, due to rotating gimbals, however, has the disadvantage that it will tend to cause the gyroscope to line up fairly quickly with the axis of the gimbals so that if the gimbals are fixed on an airplane which is unstable and tilts when it turns, or fixed on a separately supported pendulous platform, which is subject to centrifugal forces when the airplane turns, the gyroscope will be disturbed during such time. By my invention, therefore, I propose to apply the erecting torque only when the airplane is flying straight and preferably at a uniform velocity but when turning to render the means for rotating the gimbals inoperative or stopping the gimbals.

Referring to the drawings in which the preferred form of the invention is shown, Fig. 1 is a vertical section, partly in elevation, of my gyro vertical.

Fig. 2 is a vertical section at right angles to Fig. 1, the gyro proper, however, being shown in elevation.

Fig. 3 is a wiring diagram showing how the means for stopping the gimbal rotation may be brought into action by a turn indicator.

Fig. 4 is a similar diagram showing how such means may be brought into action by the steering control handle on a plane equipped for semi-automatic flight.

Fig. 5 is a sectional detail of the shut-off valve for the gimbal rotating means.

Fig. 6 is a wiring diagram showing a manual means for controlling the rotation of the gimbals.

The gyroscope proper shown in Fig. 1 is an air-spun rotor 1 journalled for rotation on a normally vertical spinning axis in rotor bearing casing 2. The casing in turn is universally mounted in a U-shaped bracket 3, the casing proper being pivoted on a horizontal axis 4 within gimbal 5, the latter being pivoted on a horizontal axis 6 in said support 3. In order to rotate the gimbals, I rotatably mount frame 3 for turning about a vertical axis normally parallel to the spinning axis of the rotor 1. As shown, the frame 3 has a central downwardly extending trunnion 7 rotatably supported on thrust bearing 8 and guide bearings 60 and 61 in base 11. In the system shown, the gyro is driven by the pressure of the atmosphere, the air normally passing the screen 9 into the channels 10 in the base member 11, thence through cross channels 12 in the stud 7 up through the central bore 13 in said stud and out through cross channels 14 therein into a channel 15 formed in the member 3. From thence the air is led into the hollow gimbal ring 5 from where it is discharged through a bore 16 in the trunnion 4 from which it emerges into passage-way 17 which is connected to the nozzle 18 adjacent the rotor.

If the trunnion 7 were rigidly mounted on the airplane the device would be operative only if the average position of the airplane is substantially horizontal. I prefer, therefore, to mount the bearing block 11 in a casing 18' which is preferably pendulously supported about axes 19—20 and 21—21' parallel to the gimbal axes of the gyroscope or in line therewith in a gimbal ring 22. The entire gyro framework, therefore, is pendulously supported but the gyroscope itself within the framework may be substantially balanced or only slightly pendulous about its horizontal axis so as to be unaffected by acceleration forces. In order to exhaust air from the casing 18' I have shown exhaust tubing 20' connected through the hollow trunnion 21 of gimbal 22 to the interior thereof, the gimbal 22 in turn being connected through the hollow trunnion 23 to the interior of the casing 18', so that air may be exhausted from the casing 18' without interfering with its freedom of support.

For rotating the gimbals of the gyroscope, I have shown an impulse wheel 25 mounted for rotation in casing 26 and driven by air jet 27. Air is led to the jet through pipe 28 connected to the interior of the channel 10. Rotation is imparted from the wheel to the gimbal rings through any suitable gearing such as a worm 29 mounted on the shaft 30 of the wheel 25, the worm meshing with the worm wheel 31 on a vertical shaft carrying at its upper end gear 32 which meshes with the gear 33 secured to the hollow trunnion 7.

For rendering the air drive inoperative during turning of the craft or other acceleration, or in other words, freeing the gyroscope from its gravitational control, I have shown a shut-off valve 32' normally held open by spring 33'. When, however, the solenoid 34 is excited, the core 35 is pulled inwardly thus closing the valve 32' on its seat 36 and shutting off the air supply. At the same time I may also apply a brake to rapidly bring the rotating gimbals to rest. For this purpose I have shown a brake drum 37 on the trunnion 7 having a brake band 38 thereon which is applied in the usual manner by a solenoid 39, the solenoid preferably being placed in the same circuit as the solenoid 34.

The two solenoids may be excited manually by the operator whenever the airship turns or accelerates. I prefer, however, to provide an automatic or semi-automatic means for energizing the solenoids at least when the airplane turns. In bombing operations, for instance, the airplane is much more likely to turn than to change its speed materially. For this purpose I have shown solenoids 34 and 39 in circuit with contacts 40—41 on a gyroscopic turn indicator 42. These instruments are well known in the art and need not be described in detail. Suffice it to say, whenever the airplane turns, the indicating arm 43 turns to the right or left as the case may be thus completing a circuit through one or the other of contacts 40—41, and exciting the solenoids. By placing the contacts 40—41 a considerable distance apart, the circuit will not be closed unless the airplane is turning at a sufficiently great angular velocity to cause the arm 43 to complete the circuit. By this means energization of the solenoids is prevented during ordinary yawing of the craft and will only occur when a marked turn is made, which would adversely affect the gyro vertical.

Instead of using the turn indicator I may place contacts 40'—41' on the steering handle 44 of an airplane, which contacts would be completed when the aviator moves the steering handle to turn the rudder 45. Preferably, however, such a system is employed in connection with a semi-automatic system of steering, such as shown in the U. S. patents to Lawrence B. Sperry No. 1,757,096, dated May 6, 1930 and No. 1,707,690 dated April 2, 1929. According to this system the plane is normally steered on a straight course automatically from the free gyroscope 46, but when it is desired to change the course the aviator grasps the handle 44 and moves it to turn the rudder 45 either directly or through a servo motor system (not shown). When the handle 44 is moved by completing contact 40' or 41' it energizes the solenoid 47 and locks or cages the gyroscope rendering it inoperative and keeping it in line with the fore and aft line of the craft. I prefer to employ the same contacts 40'—41' to excite the solenoids 34—39 as shown, which throw out the gravitational control by stopping the gimbal rotation. When the new course is arrived at, the operator releases the handle 44 when the automatic steering of the plane is resumed and the contacts 40—40' broken to start up the gimbal rotation again.

In Fig. 6 I have illustrated diagrammatically a manual means for controlling the rotation of the gimbals at will so that the aviator may stop the rotation during the turning and adjust the speed of the same. As shown, I effect the control of the speed through a rheostat 50 in series between the source of supply 51 and the electric motor 52 which may rotate the gimbals. It will be readily apparent that the operator by means of the rheostat handle 53 may stop and start the motor 52 at will and control the speed thereof.

From the foregoing, the advantages of my invention for bombing operations will be apparent. When the bomber is still some distance from the target, a straight course may be maintained and the gyroscope will be forcibly maintained in the vertical by the rotating gimbals. Upon nearing the target, rapid maneuvering may become necessary to avoid the enemy's fire, and during this time the gyroscope operates as a free gyroscope, unaffected by acceleration forces. When a straight course is again resumed, the erecting torque will again come into operation to correct any slight inclination that the gyroscope may have acquired.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro vertical for moving craft, the combination with a gyroscope having a rotor with a normally vertical spinning axis and a gimbal suspension therefor for supporting the same with three degrees of freedom, of means for rotating the gimbals about the axis of spin of the rotor, and means responsive to turning of the craft for rendering said rotating means inoperative.

2. In a gyro vertical for moving craft, the combination with a gyroscope having a rotor with a normally vertical spinning axis and a gimbal suspension therefor for supporting the same with three degrees of freedom, of means for rotating the gimbals about the axis of spin of the rotor, and means responsive to turning of the craft for stopping the rotation of said gimbals.

3. In a gyro vertical for moving craft, the combination with a gyroscope having a rotor with a normally vertical spinning axis and a gimbal suspension therefor for supporting the same with three degrees of freedom, of means for rotating the gimbals about the axis of spin of the rotor, means responsive to turning of the craft for rendering said rotating means inoperative, and a second gimbal system for pendulously supporting the elements hereinbefore recited.

4. In an airplane equipped for automatic flight, the combination with the steering and stabilizing gyroscopes, of gravitational means for normally controlling the latter, means for changing course at will, and means brought into action by such means for caging the steering gyroscope and for freeing the stabilizing gyroscope from gravitational control.

5. An automatic steering gear for aircraft comprising two free gyroscopes for steering and stabilizing respectively, the former having a normally horizontal spinning axis and the latter a normally vertical spinning axis, a gravitational control for the latter, which may be thrown in or out, means for changing course, and means brought into action thereby for caging the steering gyroscope and for throwing out the gravitational control on the stabilizing gyroscope.

6. An automatic steering gear for aircraft comprising two free gyroscopes for steering and stabilizing respectively, the former having a normally horizontal spinning axis and the latter a normally vertical spinning axis, a gravitational control for the latter which may be thrown in or out, means for forcibly realigning the former, and means for changing course, such means including means for simultaneously realigning said steering gyroscope and for freeing the stabilizing gyroscope from gravitational control.

7. In a gyro vertical for moving craft, the combination with a gyroscope having a rotor with a normally vertical spinning axis and a spinning means therefor a gimbal suspension therefor for supporting the same with three degrees of freedom, including said suspension, a supporting or gimbal frame, an outer casing, means for mounting said frame in said casing for rotation about a normally vertical axis, means for so rotating said frame, and a universal support for pendulously supporting said casing and its contained parts independent of said rotor spinning means.

8. In an aircraft having a steering means, a universally mounted, gimbaled gyroscope, means for rotating the gimbals about the axis of spin of the rotor of said gyroscope, and means responsive to movement of said steering means to turn the craft for temporarily stopping the rotation of said gimbals.

9. In an airplane equipped for automatic flight, the combination with the steering and stabilizing gyroscope, of gravitational means for normally controlling the latter, means for changing course at will, and means brought into action by such means for temporarily freeing the stabilizing gyroscope from gravitational control.

10. A gyro vertical for moving craft comprising an enclosing casing, a gimbal support therefor, means for exhausting the air therefrom through said gimbal, a gyro rotor having a normally vertical spinning axis, a rotor bearing frame therefor, an air jet thereon for spinning said rotor, a hollow gimbal ring for universally mounting said frame for oscillation about a horizontal axis and for leading air to said jet, a hollow support therefor, and a vertical bearing for mounting said support for rotation about a vertical axis in said casing, said bearing being hollow to admit atmospheric air to said support from whence it passes to said gimbal ring and thence to said jet.

11. A gyro vertical for moving craft comprising an outer gimbaled pendulous support, a gyroscope including a rotor and rotor spinning means, a universal inner gimbal mounting for said gyroscope within said support for supporting said gyroscope in substantially neutral equilibrium, and means for imparting gravitational control thereto comprising a rotating means for a second inner gimbal mounting independent of said rotor spinning means.

PRESTON R. BASSETT.